United States Patent [19]
Guster et al.

[11] 3,906,504
[45] Sept. 16, 1975

[54] TUNNEL SEARCHER LOCATION AND COMMUNICATION EQUIPMENT

[75] Inventors: Allan Guster, Kensington Park; Jeffrey E. Patterson, Seacliff Park, both of Australia

[73] Assignee: The Commonwealth of Australia, the Secretary Department of Supply, Canberra, Australia

[22] Filed: Oct. 8, 1969

[21] Appl. No.: 866,794

[30] Foreign Application Priority Data
Oct. 8, 1968   Australia............................ 44390/68

[52] U.S. Cl................. 343/112 R; 324/47; 325/28; 343/112 D
[51] Int. Cl.².......................................... G01S 5/04
[58] Field of Search............... 343/112, 112 D, 719; 325/28; 324/47

[56] References Cited
UNITED STATES PATENTS
2,955,778   10/1960   Beveridge................ 343/112 D UX
3,046,549   7/1962   Kalmus..................... 343/112 D UX

OTHER PUBLICATIONS
"Propagation of Radio Frequency Energy Through the Earth", by F. M. McGehee, Jr., Geophysics, Vol. 19, No. 3, July, 1954, pp. 459-477.

Primary Examiner—Maynard R. Wilbur
Assistant Examiner—Richard E. Berger
Attorney, Agent, or Firm—Waters, Schwartz & Nissen

[57] ABSTRACT

A method of locating and plotting tunnels by moving a portable receiving unit in which is an orientatable coil over an area to be searched while locating a transmitting unit in the tunnel itself, transmitting a signal from the transmitting unit which has a short pulse duration but a considerably longer interval between pulses, and measuring the distance between the transmitter and receiver by amplitude calculation, means being provided also to measure the relative angle of the receiver in relation to the transmitter by orientating the coil to permit depth and position calculation to be determined.

9 Claims, 7 Drawing Figures

1. HORIZONTAL COMPONENT $$B_p = \frac{\mu r i N z}{4\pi} \int_0^{2\pi} \left[ \frac{\cos\phi}{[p^2+r^2+z^2+2pr\cos\phi]^{3/2}} \right] d\phi$$

2. VERTICAL COMPONENT

$$B_z = \frac{\mu r i N}{4\pi} \int_0^{2\pi} \left[ \frac{r - p\cos\phi}{[(p^2+r^2+z^2+2pr\cos\phi)^{3/2}]} \right] d\phi$$

3. ABSOLUTE VALUE OF FIELD $$(B_a) = (B_z^2 + B_p^2)^{1/2}$$

WHERE   r = Radius Of Transmitter Coil In Meters
        i = Current In Transmitting Coil In Amperes
        N = Number Of Turns On Transmitting Coil
        μ = Permeability In Henrys Per Metre
        z = Vertical Distance In Metres
        p = Off-Set Distance In Metres NOTE + These Expressions Give Flux Densities At A Point In Space But Require Modification To Correct For A Receive Loop Of Finite Dimensions.

FIG 1 Simple Depth Measurement, Vertical Direction

FIG 2. Principle Of Operation

TRACKING UNIT

TUNNEL SEARCHER'S UNIT.

*FIG 2A* Proposed Equipment

OPERATIONAL NOMOGRAM

TYPICAL NOMOGRAM ÷ To Use, Read (Ba) Locate Curve (2)
Read (Bz/Bp) Locate Curve (1)
From Nomogram Read Off Depth And Off-Set.

FIG 3 Depth And Distance Measurement

1. HORIZONTAL COMPONENT $$Bp = \frac{u r i N z}{4\pi} \int_0^{2\pi} \left[ \frac{\cos \phi}{(p^2 + r^2 + z^2 + 2pr \cos \phi)^{3/2}} \right] d\phi$$

2. VERTICAL COMPONENT $$Bz = \frac{u r i N}{4\pi} \int_0^{2\pi} \left[ \frac{r - p \cos \phi}{(p^2 + r^2 + z^2 + 2pr \cos \phi)^{3/2}} \right] d\phi$$

3. ABSOLUTE VALUE OF FIELD $$(Ba) = (B_z^2 + B_p^2)^{1/2}$$

WHERE  r = Radius Of Transmitter Coil In Meters
         i = Current In Transmitting Coil In Amperes
         N = Number Of Turns On Transmitting Coil
         u = Permeability In Henrys Per Metre
         z = Vertical Distance In Metres
         p = Off-Set Distance In Metres NOTE ÷ These Expressions Give Flux Densities At A Point In Space But Require Modification To Correct For A Receive Loop Of Finate Dimensions.

FIG 3A

FIG 4. (UNDERGROUND EQUIPMENT)

FIG 5. ABOVE GROUND EQUIPMENT.

TUNNEL SEARCHER LOCATION AND COMMUNICATION EQUIPMENT

This invention relates to the tracking of communication with searchers in underground tunnels.

A system is required to enable tracking personnel to continuously fix, in plan and depth, the position of a tunnel searcher as the latter progresses along a tunnel.

Knowledge of the position of a tunnel searcher is important to tracking personnel in order to effect emergency assistance to or rescue of a searcher. In addition, information concerning the layout of the tunnel is necessary if subsequent destruction of the tunnel is to be carried out using shaped charges placed in position above ground.

At present, a tunnel layout is established by distance and magnetic bearing measurements relayed by a tunnel searcher, via a communications wire reeled out along the tunnel, to tracking personnel. This method is time consuming and inaccurate.

In situations where an above ground follower method is employed, it is necessary to take into account that dense undergrowth or other obstacles will frequently restrict access above ground. Thus providsion should be made to locate the tunnel searcher from "offset" surface positions.

It will be realized that equipment carried by tunnel searchers in difficult underground environment is subject to severe restrictions in weight and size, and should be extremely simple to operate, and also under present operations of the tracking and search team are hampered by the necessity to dispense a communications cable.

A system providing two way communications without the use of a cable is desirable and gives the tunnel searchers greater freedom. Simplex operation is acceptable.

In carrying the invention into effect, theoretical studies of media by which signals could be propagated beneath the earth's surface were considered and these included:

a. Seismic and Geophysical studies
b. Earth Resistivity
c. R.F. Propagation
d. Electro-magnetic induction fields.

Methods (a) and (b) were considered, with emphasis on locating a tunnel as an earth discontinuity from above ground, although the involvement of tunnel searchers in method (b) was also considered. These two methods were rejected as they appeared to require undue complexity of equipment, setting up and computation.

Methods (c) and (d) were investigated on the basis of the propagation characteristics of signals sent from a source carried by the tunnel searcher. Experiments were carried out using h.f. radio frequencies within the region of 6 to 7 MHz, and although this method appeared feasible difficulties were encountered due to above ground interference effects.

Method (d) using magnetic induction fields at frequencies of 5kHz to 100kHz proved to offer the best solution, with minimum interference effects and improved security, and the present invention is thus based on this method.

To avoid the need of using a wire trailed out from a wire dispenser, as is current practice, the present invention envisages two methods of "wire-less" two way communications, the first method using r.f. communication involved using portable radio transceivers, the second method involving voice modulation of the magnetic induction field used for tunnel searcher location. This latter method is preferred as it has the added attraction of good security since the transmission can only be detected over a range comparable with the range of the location system.

The broad system according to this invention involves a portable transmitting unit, containing a coil and associated electronics, which is carried by the tunnel searcher, and either a single receiving unit containing a coil and associated electronics carried by the tracking personnel.

The basic problem resolves to the accurate measurements of distance and angular location of a signal.

Distance measurement relies upon the inverse cube law of field strength against distance away from the field source.

In the case of a single hand-held receiver system, distance is measured directly by the absolute level of field strength at the receiver. With this method a stable transmitting level and stable amplitude measuring receiver are most important. Assuming satisfactory signal generation and detection stability, reasonably constant measurements have been indicated for varying terrain, the measurements being unaffected by relatively large ferrous objects (e.g. vehicles) within the magnetic path. Calibration of the receiver to suit different locations may be necessary because of the varying signal attenuation constants encountered. The computations involve complicated electronics, but a high degree of accuracy, independent of soil type and relatively short term drifts in absolute transmitter power can be obtained for up to long ranges.

Severe restrictions are of course, placed upon the size and weight of the transmitting unit carried by the tunnel searchers and, as a relatively high power field is required, this is best provided by short duration pulses, (e.g. the system employs 2.5ms pulses at a repetition rate of approximately 2 pulses/s).

To obtain an accurate location of the tunnel searcher, it is necessary that both the transmitter and receiver coils are within 15° of the horizontal. In some instances the tracking personnel using a hand-held receiver unit can position himself directly above the tunnel searcher and read depth directly from a calibrated meter scale.

In situations where it is not practicable for the tracking personnel to move directly over the tunnel searcher (for example, due to dense foliage), special procedures are necessary to determine the depth, distance of offset and direction of the tunnel searcher.

With the hand-held receiver system, a plot of the tunnel (in plan and depth) can be obtained by manually marking out or recording progressive readings given by the tracking personnel.

It will be appreciated that the main problem with the magnetic induction field method is the rapid signal attenuation with distance due to the inverse cube law. Therefore the first consideration was to optimize the transmit coil to enable the transmitter to operate at the maximum possible efficiency.

To select the optimum frequency of operation and to design the most efficient transmitter coil (taking into consideration such factors as weight, resistance and stray capacity) a computer program was prepared. The program reads initial constants and wire data, and computes an efficiency factor for all frequencies up to 100kHz and all wired sizes up to 50 s.w.g. This efficiency factor is given by:

$$\eta_t = \frac{AN_t f}{R_e}$$

where:
A = coil area in square meters;
$N_t$ = number of turns;
$f$ = frequency in kilohertz;
$R_e$ = effective A.C. resistance (ohms).

The computation of $R_e$ takes into consideration stray winding capacitance and proximity effects.

The program produced several maxima, one being at 22kHz and a second at 50kHz. The 50kHz frequency was selected, having in mind its greater suitability for voice modulation of the magnetic induction field for communication purposes is intended.

The experimental transmitter coil consisted of 55 turns of 29 s.w.g. wire wound in one double spaced layer on a former, 6in square.

The following characteristics (found by measurement) of the coil agreed closely with the computed values:

| | |
|---|---|
| Inductance | 1.06mH |
| Self capacitance | 5.7pF |
| Resonant capacitance | 0.01μF |
| D.C. resistance | 6.1 ohms |
| Effective a.c. resistance | 6.2 ohms |

Having selected 50kHz as the optimum frequency a separate computer program was devised to select the most efficient receiver coil, the program computes an efficiency factor for all wire gauges and differing numbers of turns. In this case the efficiency factor on which selection was made was given by:

$$\eta_r = \frac{AN^3 f}{R_e}$$

The computation of effective resistance includes the effects of stray capacity and proximity losses caused within the winding and by the presence of the Faraday Shield.

The coil consisted of 320 turns closewound in one layer on a 12-inch square former with 45 s.w.g. enamelled wire, which is surrounded by a Faraday Shield of aluminium foil spaced 0.25in from the winding by means of Polyester foam. The following characteristics were measured:

| | |
|---|---|
| Inductance | 0.834 × 10$^5$μH |
| Capacitance for resonance | 0.0001μF |
| Effective a.c. resistance | 5354.3 ohms (with Faraday Shield) |
| Effective a.c. resistance | 1117.3 ohms (without Faraday Shield) |

The location field transmitter is fed from a 50kHz square wave which is stepped down from a 200kHz crystal oscillator. This square wave is passed through a gate to give a 2.5ms pulse of 50kHz signal to the output stage every 500ms. The output employs a push-pull arrangement of two transistors operating in a swithcing mode. The 50kHz square wave output of this stage is connected directly to the transmitter coil which is tuned to series resonance. Because this circuit has a low resistance, its bandwidth (centered around 50kHz) is narrow and the current in the loop is a 50kHz sine wave.

The results indicated that to achieve reasonable pickup voltage in a small hand-held receiver coil at ranges up to 300ft, a transmitter coil current between 3 and 5 amps peak would be required. The circuit is designed to feed a 3.0 amp peak current pulse into transmitter coil.

In order to supply this high current from relatively low capacity batteries, a simple switching regulator is used to charge a 2500μF capacitor via a d.c. converter operating from a bank of primary or secondary cells having a terminal voltage of 7.5V.

The switching regulator is arranged to switch off during the transmitted pulse periods so that the capacitor supplies the power for the transmit output pulse and is replenished from the batteries, via the regulator, during the relatively long periods between pulses. The regulator is controlled from a temperature dependent reference to compensate for changes in loop resistance with temperature.

This combination of a switching output stage and a switching regulator insures that power dissipation is minimized and battery life extended.

The magnetic field from the transmitter induces a voltage in the broadly tuned receive coil. This signal is applied to a narrow band filter having a band pass of the order of 2kHz either side of 50kHz and then amplified in a balanced low noise amplifier. The pulses of 50kHz are then peak detected to produce a d.c. pulse, the amplitude of which is proportional to the positive peak of the input signal.

The d.c. pulse is processed by a number of analogue stages in order to produce an output signal which can be directly related to the distance. The first stage, which has a logarithmic characteristic is followed by a one third gain amplifier and an anti-logarithmic amplifier having a characteristic inverse to the first stage. This chain of computation allows the display of the inverse cube law function as a proportional meter indication.

This signal is now gated by means of a field effect switch to charge a storage circuit having a short charge time (of the order of 0.2ms) and a discharge time of several seconds.

During the period of time when the gate to the hold circuit is held open the average value of the output from the logarithmic amplifiers is stored.

The output of the storage cirucit is used to indicate distance directly on a meter.

The threshold level at which the gate into the hold circuit opens is automatically controlled to a level slightly below the location pulse. This makes the receiver more immune to noise pulses unless their amplitude approaches that of the location pulse. As the magnetic field is used for communications, this provides a means for preventing the interaction of communications with the location system.

During normal operation it is intended that both the transmitter coil and the receiver coil will be held horizontal. An accurate depth reading will be obtained when the receiver coil is directly over the tunnel searcher. Under these conditions the flux density at a point on the z axis is given by:

$$B_z = \frac{\mu N_t i r_t^2}{2(r_t^2+z^2)^{3/2}}$$

where:
- $B_z$ = flux density in Webers per square meter;
- $N_t$ = number of turns on transmit coil;
- $i$ = current in transmit coil in amperes;
- $r_t$ = radius of transmit coil in meter;
- $z$ = vertical distance in metres;
- $\mu$ = permeability in Henrys per meter.

For the case of $z \gg r_t$ $$B_z = \frac{\mu N_t i r_t^2}{2z^3}$$

This means that the inverse cube law applies well until the distance becomes comparable with the dimensions of either of the coils. In normal use the tracking personnel are able to move towards, and to a point immediately above the tunnel searcher. The depth reading will then be displayed on the meter scale.

For most distance readings the accuracy will be only slightly affected by deviations from the horizontal (up to 15°) and in this mode it is possible to read distances with an accuracy of better than 1 ft over the range of the instrument.

The case where the tracking personnel may not be able to move to a position directly above the tunnel searcher, is considerably more difficult to solve. However, if the transmitter coil is considered horizontal relative to the coordinate axes it is possible to derive equations for the flux density at a point in space in the horizontal ($xy$) plane.

In fact the field is similar in all directions within this plane as there must be symmetry about the $z$ axis. The flux densities in the $z$ and $x$ directions are derived from the general equations:

$$B_z = \frac{\mu r i N}{4\pi} \int_0^{2\pi} \frac{r-\rho \cos\phi}{(\rho^2+r^2+z^2+2\rho r \cos\phi)^{3/2}} d\phi$$

$$B_x = \frac{\mu r i N z}{4\pi} \int_0^{2\pi} \frac{\cos\phi}{(\rho^2+r^2+z^2+2\rho r \cos\phi)^{3/2}} d\phi$$

This field component is uniform about the $z$ axis in the xy plane so that in any direction at a distance $\rho$ from the origin, $B\rho = Bx$ when $|\rho| = |x|$.

These equations are in the form of Legendre's complete elliptic integrals of the third kind. A solution can be achieved using tables.

A computer program has been produced to simulate the actual receiver working in this situation. This program accepts as data the transmitter and receiver coil constants as well as tabular information to evaluate the above integrals. The program integrates the value of flux density over the area of the receiver coil, to produce a value for total flux cutting the receiver coil. The induced voltage is directly proportional to this value of total flux.

The computer readout lists the total flux in Webers in both the $x$ and $z$ direction, while the absolute value of field computed is: $\phi_t = (\phi_x^2 + \phi_z^2)^{1/2}$
where: $\phi_t$ = total flux cutting the coil;
$\phi_x$ = total flux cutting the coil in $x$ directions;
$\phi_z$ = total flux cutting the coil in $z$ directions;

and the ratio of fields is computed as:

$$R = \frac{\phi_z}{\phi_x}$$

The programme computes these values for various values of offset distance and depth. A simple nomogram has been designed which allows the depth and offset distance to be readily determined from the vertical and horizontal field readings.

The transmitter and receiver equipment enables a range of 200ft to be readily achieved. The limit of range occurs when the signal-to-noise ratio drops to a point where it is difficult to measure the absolute amplitude. With the experimental receiver used at a distance 200ft from the transmitter and with coils parallel and on the same normal axis, the signal is approximately three times the typical highest noise pulses.

To measure vertical depth, the receiver is provided with three ranges, viz. 0 to 20ft, 0 to 80ft 2000 to 200 ft, and it can be shown that coil alignment is only critical at short distances.

Experiments show that with the receiver positioned directly above the transmitter depth can be measured to an accuracy of better than 1 ft.

To measure offset and depth, measurement of the $x$ and $z$ field components are involved, and the accuracy depends to some extent on the position on a nomogram where the result falls. Setting the meter readings, obtained with the loop horizontal and vertical, on the nomogram enables the offset distance and depth to be read.

To achieve measurement of direction the receiver coil is set in a vertical position. It is then possible to locate the direction of the transmitter by rotating the receiver coil in azimuth about the vertical axis for a null in the signal strength.

Some error in the angular location procedure can be caused by misalignment of the transmitter coil from the horizontal but this is not great.

This ability to determine the direction of a transmitter may be used in two ways when locating a tunnel searcher. The first involves finding the approximate direction and then moving in this direction with the coil horizontal until a minimum distance reading is obtained. The second method involves a combined depth offset and directivity measurement and then moving to the indicated position directly over the tunnel searcher before performing an accurate location.

In the foregoing description it is shown how the invention can be used to locate personnel moving within a tunnel, and at this stage reference can be made to the accompanying drawings which show by way of example how the invention is applied.

Figure 1:
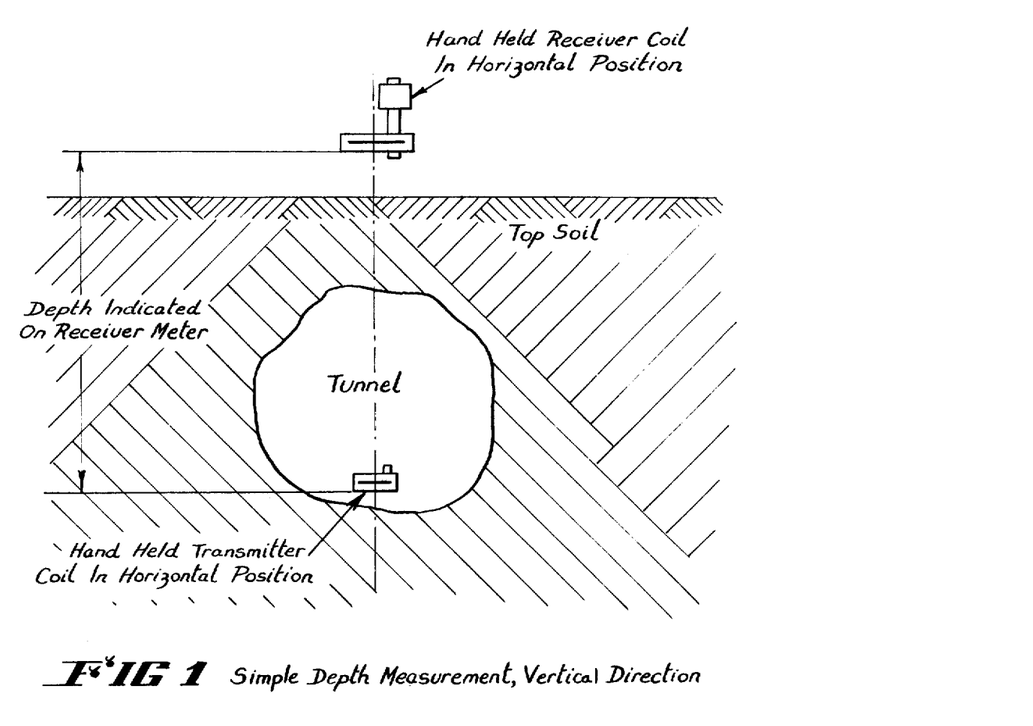
FIG. 1 is a section of soil showing a tunnel and indicating how a simple depth measurement can be made in a vertical direction.
Figure 2:
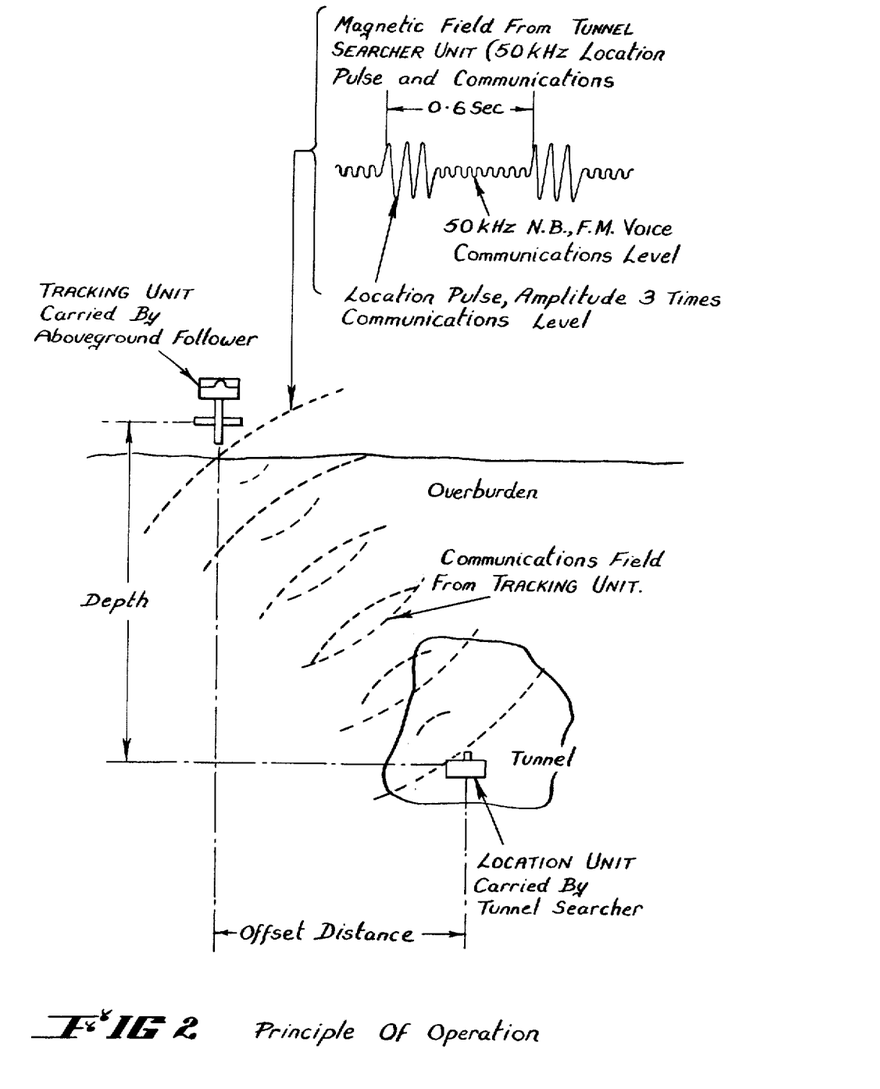
FIGS. 2, 2A and 3, 3A show the principle of operation and method of measuring depth and offset distance respectively
Figure 2A:
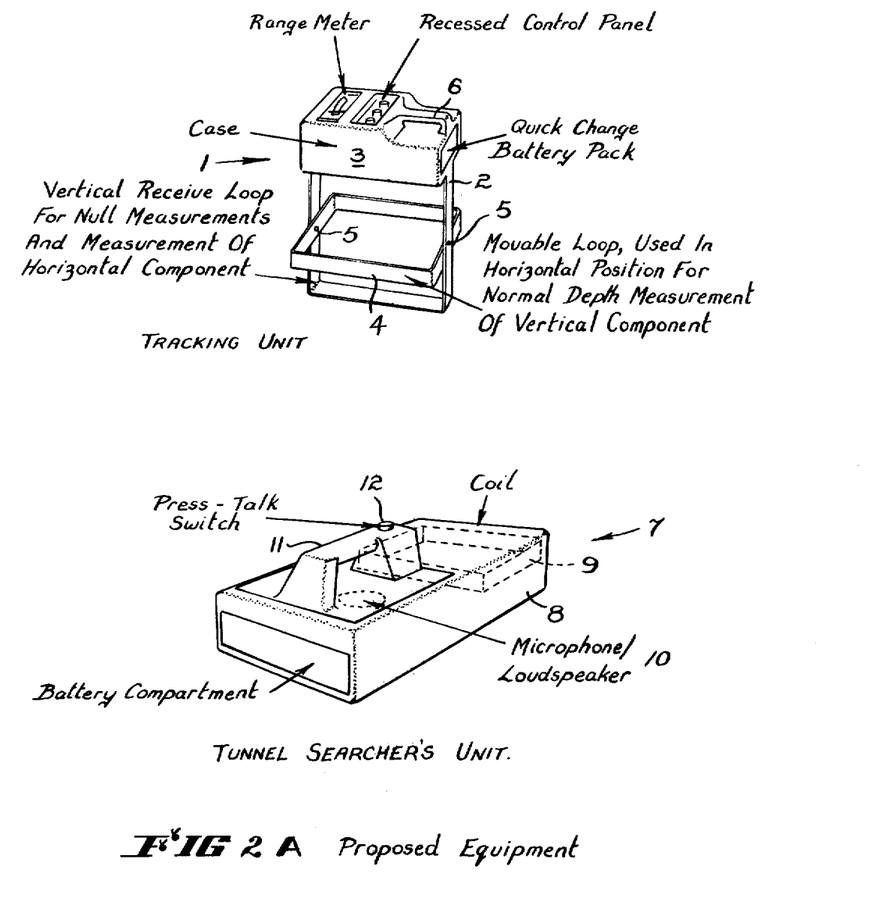
Figure 3:
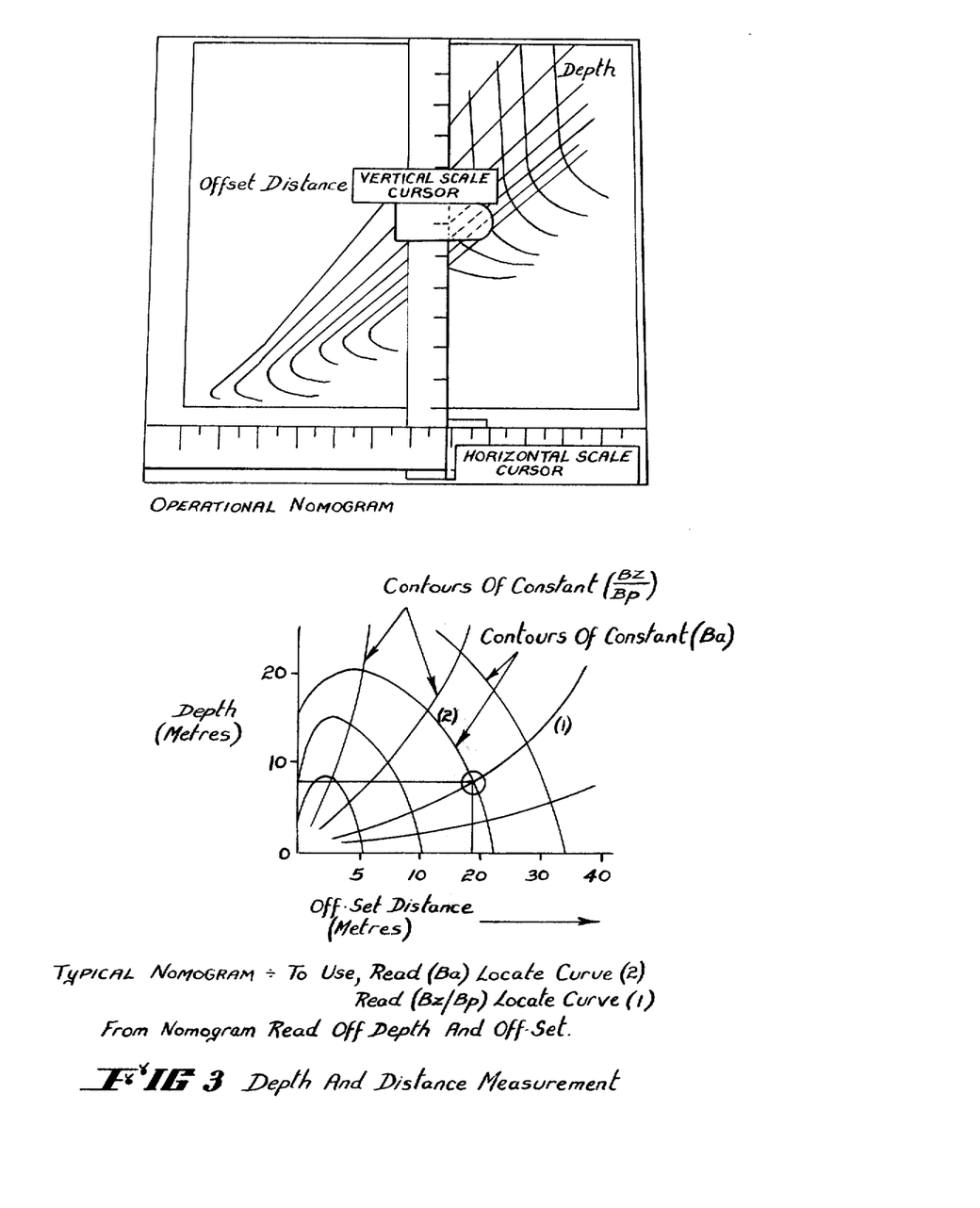
Figure 3A:
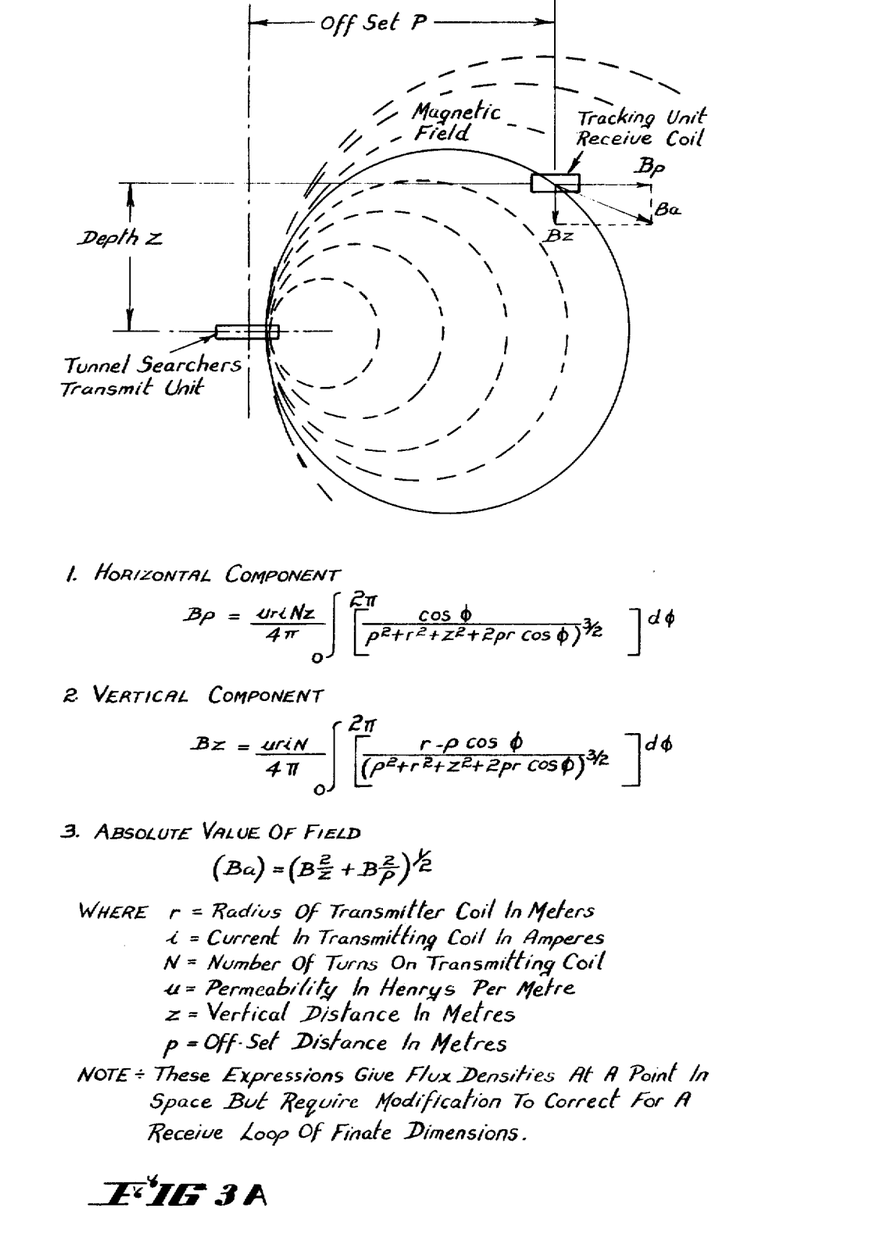
Figure 5:
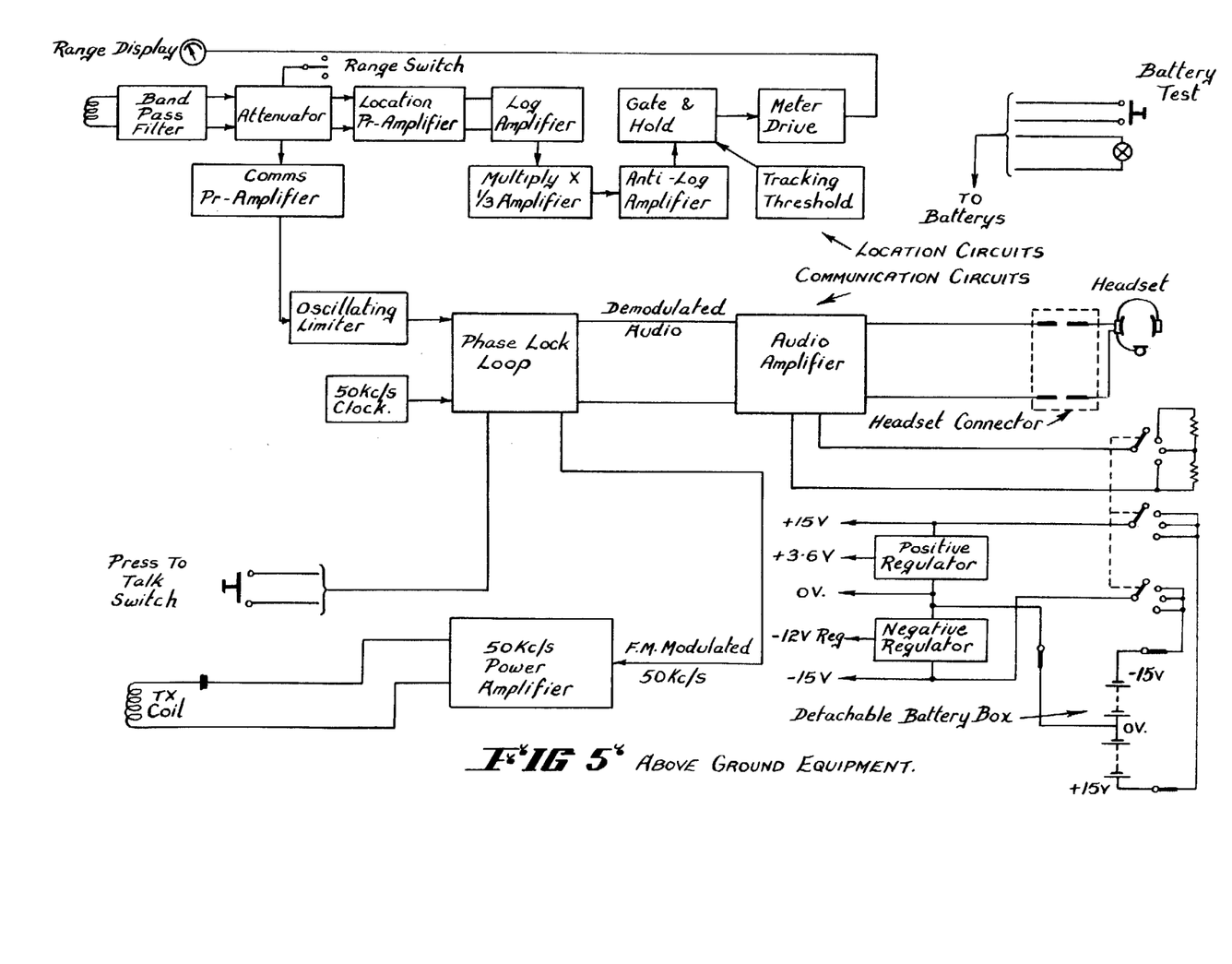

The actual devices illustrated in FIG. 2A comprise the tracking unit 1 which is used above the ground and includes a frame 2 depending from a housing 3, which housing contains the circuitry of FIG. 5 and also the battery pack. A loop antenna 4 is carried by the frame 2 on hinge pins 5 to allow angulation. A carrying handle 6 is provided.

Figure 4:
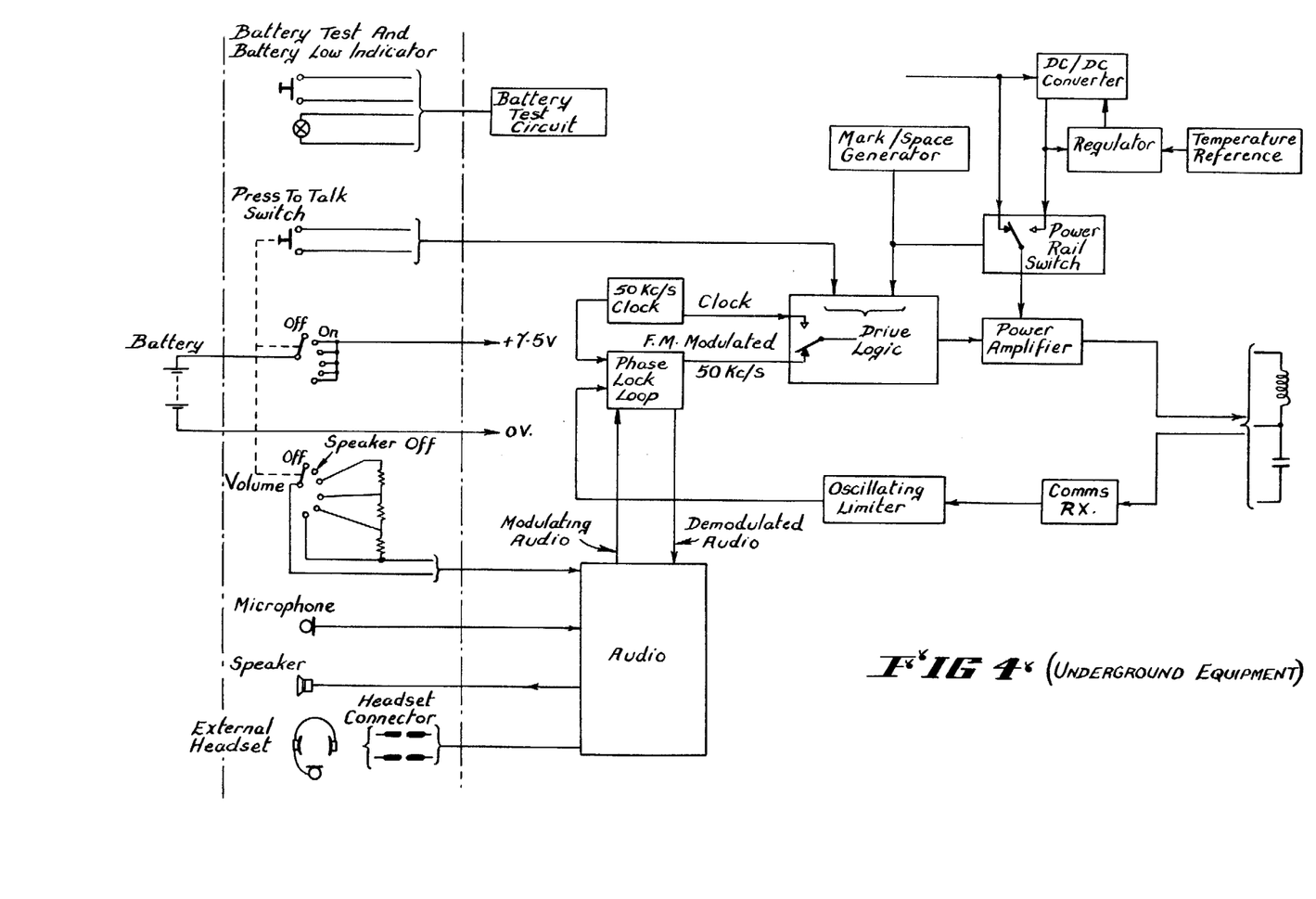
FIGS. 4 and 5 are block diagrams of the underground transmitter/receiver and the above ground transmitter/receiver circuits respectively.

The tunnel searcher unit 7 comprises a housing 8 in which is contained the circuitry of FIG. 4 and a battery, but also carried in this housing is a coil 9 which serves as the antenna for this unit. A microphone/loudspeaker 10 is included. A carrying handle 11 is again provided and this has a press-talk switch 12 incorporated.

Preliminary investigations have shown that the simplest method of achieving communications is to frequency modulate the current in the transmit coil over a bandwidth of about 3kHz. Only a minimum of additional components are required to achieve a narrow band F.M. modulationdemodulation system.

Amplitude modulation systems were rejected because of the problems of modulating the supply to the power amplifier, which would have necessitated an excess of power dissipated in the tunnel searchers transmitter unit. Whereas the signal for location purposes must be sufficiently above the noise level to allow for an accurate amplitude measurement, the requirement for continuous field radiation during speech periods, means that the power available for communications must be greatly reduced to be compatible with battery life.

Consequently it is required that the demodulation system be capable of working over the maximum range of the location system with a received signal much below the signal level of the location field pulse.

To achieve optimum results special techniques have been adopted in the design of an experimental receiver. The more significant techniques involved firstly an oscillating limiter, which has been included between the preamplifier and the demodulator, and secondly a phase locked detector.

Conventional limiters provide an improved signal-to-noise ratio at the output when the input signals exceeds −4.5dB of the total means noise power. The oscillating limiter, which locks to the input signal, provides optimum positive feed-back only at the locked input frequency and partial cancellation of all other frequencies. Thus, improved results for input signals considerably below this figure are achieved.

The suggested signal-to-noise ratio which can be demodulated for satisfactory speech intelligibility is of the order of 8 dB.

To achieve this type of performance it is necessary to use special demodulation techniques based on the use of a phase locked oscillator.

In the integration of the location system with the two way communication system, the greatest problem exists in the integration of a communications transmitter/-receiver with the tunnel searchers transmitter because of weight and space restrictions.

Good economy can be obtained by using the phase locked oscillator for both detection and modulation. An electronic switch is used to ground the coil of the below ground unit for communications reception. Thus a single coil serves for both location pulse transmissions and voice communications transmission and reception.

Above ground, the integration of a communications transmitter/receiver with the tracking equipment does not present the problems encountered with the tunnel searcher's equipment, as the same weight and space restrictions do not apply. The communications circuitry is identical with the underground circuitry with the exception that the tracker's communication transmitter requires higher power to compensate for the smaller dimensions of the receiver coil in the underground unit. A separate coil is required for the communications transmitter in the above ground unit as it is not practical to feed a coil having the impedance of the above ground receiver coil.

The center frequency of the communications transmitter is locked to the frequency of the oscillator of the location field transmitter. The circuit is basically a voltage controlled oscillator working in a phase locked loop which can be modulated by applying a signal to the oscillator frequency control input. This modulation is applied from a pre-amplifier which incorporates an automatic level control.

The frequency modulated output of the oscillator is centred about 50kHz and is applied to the coil driving amplifier. The output driving amplifier is essentially the same as the higher powered version used to excite the coil for the location field generator. In this case, however, the bandwidth of the coil is increased by lowering its "Q" factor, and the peak current switched by the output transistors is reduced.

The pulses which control the gating of the location field are also used to inhibit communications for 2.5ms every 500 ms whilst the location field pulse is being transmitted.

The output from the receive coil is taken via a preamplifier, filter and oscillating limiter, to a phase locked detector. The centre frequency of the phase locked loop is held at 50kHz by means of a reference oscillator. It is required that the frequency of this oscillator match the frequency of the transmitter to an accuracy of ±50Hz. The output of the demodulator is then applied, via an audio amplifier, to head phones.

The capacity of the battery pack enables approximately 4 hours of continuous voice transmission (with 900mA peak current flowing in the transmit coil) to be achieved. As normal speech should take place for only a fraction of the search time a 7 or 8 hour search period would be possible.

An experimental model was used to determine the maximum usable range of communication. In this experiment, a sine wave signal was used as a modulation source and the output of the receiver measured for noise content. The region of usable intelligibility was demonstrated to be at least 200ft.

Experiments conducted with the experimental equipment to assess the effectiveness of its use for the measurement of depth and offset distance showed the feasibility of using the hand-held equipment for this purpose. To facilitate the operational procedure involved in this measurement, the hand portable receiver has been provided with a single receiver coil-capable of being rotated through 90° to read both the horizontal and vertical field components for the computation of depth and offset distance.

In addition to military applications involving searching of insurgent used tunnels, the invention has considerable application in the fields of civil and mining engineering. For example, mapping of large tunnels such as used in sewer work as well as location and communication within underground mines.

What we claim is:

1. A method of locating and plotting tunnels which consists of moving a portable electromagnetic induction field receiving unit, containing a coil which can be orientated, over an area to be searched, locating a transmitting unit in the tunnel to give pulsed eliptical field lines, determing the location of the transmitter by measuring the horizontal and vertical components of the pulsed field to derive the depth and offset distance of the transmitter in relation to the receiver, and determining direction of the receiver by further orientation of the said coil in the said pulsed field.

2. The method of claim 1 wherein the transmitting unit operates on signals of short pulse duration, using a switched regulator which is switched off during the transmitted pulse periods and including a capacitor which supplies the power for the transmit output pulse and is replenished from batteries via the said regulator during the periods between pulses.

3. The method of claim 2 wherein the pulse duration is approximately 2.5ms at a repetition rate of approximately 2 pulses per second.

4. The method of claim 2 wherein said coil has a resistance and the said regulator is controlled from a temperature dependent reference to compensate for changes in coil resistance with temperature.

5. The method of claim 1 wherein a gated signal is used and the magnetic field from the said transmitter induces a voltage in a broadly tuned receive coil and the signal is applied to a narrow band filter and then amplified in a balanced low noise amplifier and the pulses are then peak-detected to produce a direct current pulse the amplitude of which is proportional to the positive peak of the input signal, the said direct current pulse being then processed by analogue stages to produce an output signal which is directly related to the distance being measured.

6. The method of claim 5 wherein a first logarithmic analogue stage is followed by a one third gain amplifier, and an anti-logarithmic amplifier having a characteristic inverse to the first said stage, whereby the computation allows a display of the inverse cube law function as a proportional metre indication.

7. The method of claim 2 wherein voice communication is included using the same magnetic field at a power level wherein the pulses which control the gating of magnetic field used for location are used also to inhibit the communications while the location field pulse is being transmitted.

8. The method of claim 1 wherein two-way voice communication is achieved by frequency modulation and wherein a single coil in the transmitting unit is used for both location and communication.

9. The method of claim 1 wherein both modulation and demodulation of voice communication is achieved by the use of a common phase locked loop circuit in each of the transmitting and receiving units.

* * * * *